United States Patent [19]

Egli et al.

[11] Patent Number: 5,565,273

[45] Date of Patent: Oct. 15, 1996

[54] TRANSPARENT HEAT PROTECTION ELEMENT

[75] Inventors: Walter Egli, Reinach; Horst Seidel, Walchwil, both of Switzerland; Simon Frommelt, Haan, Germany; Christoph Giesbrecht, Muri, Switzerland

[73] Assignee: Vetrotech AG, Walchwil, Switzerland

[21] Appl. No.: 211,504

[22] PCT Filed: Aug. 5, 1993

[86] PCT No.: PCT/CH93/00197

§ 371 Date: Jul. 15, 1994

§ 102(e) Date: Jul. 15, 1994

[87] PCT Pub. No.: WO94/04355

PCT Pub. Date: Mar. 3, 1994

[30] Foreign Application Priority Data

Aug. 11, 1992 [CH] Switzerland ............... 2508/92

[51] Int. Cl.$^6$ ..................... B32B 17/06
[52] U.S. Cl. ............ 428/426; 428/428; 428/446; 428/448; 428/920; 428/921; 427/164; 427/165
[58] Field of Search .................. 428/426, 428, 428/432, 446, 448, 920, 921; 252/601, 604, 606, 610, 611; 427/301, 372.2, 397.7, 397.8, 164, 165; 106/600, 634, 18.11, 18.12; 501/12

[56] References Cited

U.S. PATENT DOCUMENTS

| 3,721,574 | 3/1973 | Schneider | 106/74 |
|---|---|---|---|
| 4,175,162 | 11/1979 | De Boel | 428/428 |
| 4,179,535 | 12/1979 | Kalbskopf | 427/206 |
| 4,190,698 | 2/1980 | De Boel | 428/334 |
| 4,213,785 | 7/1980 | Blanc | 106/38.35 |
| 4,338,374 | 7/1982 | Neser | 428/411 |
| 4,347,285 | 8/1982 | Batdorf | 428/432 |
| 4,478,905 | 10/1984 | Neely, Jr. | 428/324 |
| 4,512,808 | 4/1985 | Pesch | 106/83 |
| 4,626,301 | 12/1986 | Nolte | 156/99 |
| 4,873,146 | 10/1989 | Toussaint | 428/428 |
| 5,244,709 | 9/1993 | Vanderstukken | 428/99 |

FOREIGN PATENT DOCUMENTS

| 0132507 | 2/1985 | European Pat. Off. . |
| 2399513 | 3/1979 | France . |
| 2607491 | 6/1988 | France . |
| 4001677 | 3/1991 | Germany . |
| 60053 | 2/1970 | Luxembourg . |

OTHER PUBLICATIONS

PCT/CH 93/00197 Search Report.
Chem Abst. vol. 107, No. 16, Oct. 1987; No. 139755 W.

Primary Examiner—Ellis Robinson
Assistant Examiner—Leonidas J. Jones
Attorney, Agent, or Firm—Notaro & Michalos

[57] ABSTRACT

The heat protection element comprises carrier elements, for example in the form of glass plates. In an interspace between, in each instance, two glass plates a protection layer comprising a cured polysilicate which is formed of alkali silicate and at least one curing agent is disposed. In the polysilicate, a molar ratio of silicon dioxide to alkali metal oxide is set to be greater than 4:1. The starting composition for the polysilicate is a free-flowable composition having a water content of up to 60 percent and capable of being introduced into the interspace between two carrier elements. After curing the composition, the high water content is retained and the polysilicate has nevertheless good inherent strength and adhesion on the carrier elements.

18 Claims, No Drawings

TRANSPARENT HEAT PROTECTION ELEMENT

FIELD AND BACKGROUND OF THE INVENTION

The invention relates to a transparent heat protection element comprising at least one carrier element and one protection layer comprising hydrous alkali silicate as well as a process for the fabrication of heat protection elements.

Transparent heat protection elements of this type are known in various implementations and are used inter alia as structural elements. Glass plates most frequently serve as carrier elements, however, other transparent materials can also be used such as, for example, synthetic materials. Especially high requirements are made of the heat protection of structural elements which, in the form of glazing, form boundaries of rooms or are used for doors. From DE C3 19 00 054, heat insulating transparent laminated glasses are known, in which a layer comprising dried hydrous alkali silicate is disposed between two glass surfaces. Under the influence of heat on this laminated glass, for example in the event of fire, the intermediate layer comprising alkali silicate foams and the water contained in the alkali silicate vaporizes. In this way the intermediate layer becomes impermeable to heat radiation and for a given length of time, forms effective protection against undesired heat transmission. Although at least one of the glass plates cracks and breaks, the glass parts adhere to the expanded foam layer. To improve heat protection, several glass plates and intermediate layers comprising alkali silicate are disposed one behind the other. In the fabrication of laminated glasses of this type, a thin layer of alkali silicate is applied in liquid form on one side of a glass plate, and this layer is subsequently dried by drawing off the excess water, for example, through the effect of heat. This drying process is expensive and requires a particular drying time whereby the fabrication process is delayed. The second glass plate must subsequently be affixed by adhesion on the intermediate or protective layer comprising alkali silicate. The manufacture of laminated glasses of this type places high demands on production in order to ensure that no opaqueness of the laminated glass due to the presence of air bubbles or other production defects, occur.

It is further known from EP A-2 192 249, to introduce the alkali silicate of the intermediate layer in the form of a hydrogel layer with increased water content. These hydrogel layers have a water content of 80 to 90% and are therefore not self-supporting. Hydrogel layers of this type are suggested in order to improve the optical properties of the intermediate layer. Since the hydrogel layer itself does not have sufficient cohesion or sufficient adhesion relative to the adjoining glass layers, it is suggested to add an organic binding agent for stabilizing the layer, for example gum arabic. Adding these binding agents is necessary in order to prevent the hydrogel from running out of the interspace between the laminated glasses or in the event one of the glass plates breaks. The disadvantages of the insufficient cohesion and adhesion of the hydrogel layer require additional expensive measures. The content of silicon dioxide is maximally 20 percent by weight and the molar ratio of silicon dioxide and sodium oxide as the alkali metal oxide, ranges from 2 to maximally 4.

SUMMARY OF THE INVENTION

Although these known transparent heat protection elements already satisfy high requirements with respect to heat and fire protection, they are still unsatisfactory with respect to processing and application of the intermediate layer comprising hydrous alkali silicate. The present invention is therefore based on the task of creating a transparent heat protection element which has a high degree of transparency and ageing stability, in which the protection or intermediate layer can be produced by casting and without drying, and the protection layer has good inherent strength as well as good adhesion on the adjoining carrier elements. The starting composition for the protection layer is free-flowing and suitable for pouring into hollow spaces and subsequently cures within an adequate period of time, to form the protection layer.

This task is solved according to the invention in that the protection layer is a polysilicate comprising alkali silicate and a curing agent, and because the polysilicate has a molar ratio of silicon dioxide and alkali metal oxide which is greater than 4:1. A lithium, sodium or potassium silicate, or a mixture thereof, is preferably employed as the alkali silicate and a sodium, potassium or lithium oxide, or a mixture thereof, is used as the alkali metal oxide.

Reactive silicon compounds containing silicon oxide are preferable as curing agents, wherein preferably silicic acid or compounds which set free silicic acid in aqueous solution are used. The use of other compounds not containing Si as curing agents or supplementary curing agents is not excluded. Suitable are: All compounds forming no insoluble precipitates in the reaction with alkali silicate and thereby having a negative effect on the optical properties, are preferred. These are compounds such as inorganic and organic acids, esters, acid amides, glyoxal, alkylene carbonates, alkali carbonates and alkali hydrogen carbonates, borates, phosphates, and paraformaldehyde. These can be used in combination with the main curing agent comprising silicic acid in small quantities, customarily less than 5 percent, without the transparency of the polysilicate layer being impaired.

This protective layer according to the invention comprising cured polysilicate has good inherent strength and develops good adhesion on the adjoining carrier elements in the form of glass plates or other transparent structural elements. The starting composition is free-flowing and readily castable. The cured protective layer is of high optical quality and transparency and has good ageing stability. The special properties of the protective layer in the form of the cured polysilicate are achieved when the polysilicate layer has a silicon dioxide content between 30 to 55 percent. The maximum content of alkali metal oxide ($M_2O$) in the form of sodium, potassium or lithium oxide, or a mixture thereof, is 16 percent. The cured polysilicate layer comprises up to 60 percent water. Thus, heat protection elements with a protective layer according to the invention reach a very high fire resistance value since a relatively large quantity of water is available for the vaporization process. The high content of silicon dioxide is achieved in that the curing agent is a silicon-containing compound, advantageously silicic acid or a compound splitting off silicic acid. In advantageous manner the polysilicate layer is disposed in a transparent heat protection element between two glass plates and forms with them a laminated element. To achieve higher heat resistance values, heat protection elements are formed in which the heat protection element comprises several polysilicate layers disposed in each instance between two glass plates and the glass plates and the polysilicate layers form a laminated element. In these arrangements according to the invention, the polysilicate layers are in direct connection with the adjoining glass plates which form the carrier elements. The adhesion between polysilicate layers and glass plates permits the direct formation of the laminated elements without an additional process of affixing by adhesion, whereby the production process is significantly simplified.

The method for the production of a transparent heat protection element using an hydrous alkali silicate is characterized according to the invention in that the alkali silicate is combined with a curing agent comprising silicon dioxide or capable of setting free silicon dioxide, and a castable composition is formed. This composition is introduced into a mould cavity or applied onto a carrier element, and subsequently the composition is cured to form a solid polysilicate layer while retaining the water content. In the cured polysilicate, the molar ratio of silicon dioxie to alkali metal oxides is adjusted to a maximum ratio greater than 4:1.

Consequently, the method according to the invention permits the construction of laminated elements which comprise several carrier elements disposed at a distance, one from the other, and to cast subsequently the interspace between the carrier elements with the pourable composition comprising alkali silicate and one or several curing agents. Due to the high water content, the composition is, to a high degree, free-flowing end can also be poured without difficulty into the interspaces of laminated glazing with small distances between the glass plates. Since the composition can be cured without drying e.g. without giving off water, to form a solid polysilicate layer, the drying process can be omitted, which significantly simplifies the production of corresponding heat protection elements. The reaction or curing time can be accelerated by heat in known manner. The potlife of the castable composition at room temperature is in any case sufficiently long in order to permit a normal course of manufacture. In the production of the heat protection elements, the composition can, as described, by introduced or poured into a mould cavity between two carrier elements. But it is also possible to apply the composition onto a carrier element and to subsequently place a second carrier element onto the protective layer while it is not yet cured, or to seal the second carrier element with the protective layer after it is cured. However, the latter would only be useful if on conventional installations for production of the known heat protection elements, transparent heat protection elements with the protective layer according to the invention are to be produced. Part of the advantage in that case is still retained since no drying process is necessary and the curing of the composition to form the polysilicate layer takes place without giving off water, which means it takes place with retention of the water content.

The composition comprising alkali silicate and curing agent is preferably freed of gas before it is processed. It is thereby ensured that no gas inclusions are present in the cured polysilicate layer, which could disturb the optical quality of the heat protection element according to the invention. However, the removal of the gas can also take place after the hollow spaces have been filled. To increase the adhesion of the polysilicate layer on the carrier elements, it is possible to add, before processing to the composition, auxiliary means in the form of anionic or non-ionogenic surfactants and/or the carrier layers can be pretreated by means of this type. The carrier layers can, in a preferred manner, also be pretreated with an adhesion enhancing agent, preferably with an organo-functional silane.

As carrier elements for the transparent heat protection element according to the invention, not only elements comprising glass, in particular glass plates, are suitable, but also other materials with the desired optical properties, as long as they meet the technical and physical requirements, for example, of the heat resistance. The resistance value of the heat protection layer is in any case improved by the increased water content. Thermally or chemically prestressed glass can also be used entirely or partially, as the carrier material.

DESCRIPTION OF THE PREFERRED EMBODIMENT

The following examples illustrate the present invention.

EXAMPLE 1

A heat protection element comprises a glazing which is assembled of four glass panes in such a way that, a distance of 1 mm is left between adjacent glass panes. Along the edges of the glass panes, the narrow sides of the hollow volumes between the glass panes is sealed with a suitable sealing material around the entire circumference of the glass panes in known manner. A filling opening is left open into each hollow space between, in each instance, two glass panes. From an alkali silicate in the form of a potassium silicate and colloidal silicic acid, a pourable composition is prepared which, after curing forms a polysilicate with a molar ratio of $SiO_2$ to $K_2O$ of 4.7:1. This liquid composition is subjected, in known manner, to a process in which gas is removed and subsequently introduced through the filling opening into the hollow spaces between, in each instance, two glass panes. The composition is free-flowing so that it can be filled in without difficulties and can displace the air in the hollow spaces, without mixing taking place. Following the complete filling of the hollow spaces, the filling openings are also sealed. The laminated element comprising four glass panes and three interspaced protective layers comprising polysilicate formed in this way, is stored in a suitable position until the reaction process has been completed and the cured polysilicate of the three protective layers has acquired the desired inherent strength and adhesion on the glass plates. To accelerate the reaction the temperature is raised to 60° C. After curing of the polysilicate is completed the laminated elements formed in this way can be handled in any manner known for laminated glass elements and they can also be cut into different shapes. The protective layer disposed between the glass plates comprising cured polysilicate has a water content of 47 percent by weight. The cured polysilicate layers disposed between the glass panes does not narrow the optical properties of the glass plate laminate in any manner, and the heat protection element produced in this way is distinguished by optimum fire resistance properties.

EXAMPLE 2

In a modified variant according to Example 1, a filling composition was used in which a mixture of potassium and lithium silicate in a ratio of 8.5:1.5 and a 30 percent silicic acid dispersion in water in a quantitative ratio, was allowed to react so that a K-Li polysilicate with a molar ratio of $SiO_2$ to $(K_2O+Li_2O)$ of 5.0:1, was obtained. Before filling in this composition, an agent in the form of a polyol for lowering the freezing point by 15 percent, was added. The water content of the cured polysilicate was 51.2 percent by weight. The fire resistance properties were practically identical to those of the element in Example 1.

EXAMPLE 3

In a varied embodiment of Examples 1 and 2, 35 mol percent of the potassium ion are replaced by sodium and as the curing agent, a hydrated precipitated silicic acid having a water content of 21 percent is used. The water content of the cured polysilicate is 44 percent by weight. The molar ratio of $SiO_2$ to ($K_2O+Li_2O+Na_2O$) is here also 5.0:1.

We claim:

1. Transparent heat protection element comprising at least one transparent carrier element and one transparent protective layer comprising hydrous alkali silicate in direct connection with said transparent carrier element, characterized in that the protection layer is a cured but not dried polysilicate formed by a combination of alkali silicate, at least about 44 to 60 percent by weight water and at least one curing agent, and that in the polysilicate, a molar ratio of silicon dioxide to alkali metal oxide is greater than 4:1, the cured polysilicate containing substantially all water that was present in the combination of alkali silicate and curing agent.

2. Heat protection element as claimed in claim 1, wherein the curing agent is silicic acid or a compound which sets free silicic acid.

3. Heat protection element as stated in claim 1, characterized in that the alkali silicate is a lithium, sodium or potassium silicate or a mixture thereof.

4. Heat protection element as stated in claim 1, characterized in that the alkali metal oxide is a sodium, potassium or lithium oxide or a mixture thereof.

5. Heat protection element as stated in claim 1, characterized in that the polysilicate layer comprises from 30 to 55 percent silicon dioxide.

6. Heat protection element as stated in claim 1, characterized in that the polysilicate layer comprises maximally 16 percent alkali metal oxide.

7. Heat protection element as stated in claim 1, characterized in that the polysilicate layer comprises a means for lowering the freezing point of the water.

8. Heat protection element as stated in claim 1, characterized in that the curing agent is a compound comprising silicon oxide.

9. Heat protection element as stated in claim 5, characterized in that the curing agent is silicic acid or a compound splitting off silicic acid.

10. Heat protection element as stated in claim 8, including an additional curing agent selected from the group consisting of inorganic or organic acids, esters, acid amides, glyoxal, alkylene carbonates, alkali carbonates and alkali hydrogen carbonates, borates, phosphates or paraformaldehyde.

11. Heat protection element as stated in claim 1, characterized in that the polysilicate layer is disposed between two glass plates and forms with them a laminated element.

12. Heat protection element as stated in claim 1, characterized in that the heat protection element comprises a plurality of polysilicate layers alternating with and being disposed between a plurality of glass plates and that the glass plates and the polysilicate layers form a laminated element.

13. Heat protection element as stated in claim 7, wherein the means for lowering the freezing point of the water comprises a polyol.

14. Method for the production of a transparent heat protection element using a hydrous alkali silicate, comprising: combining an alkali silicate with a curing agent that includes or sets free silicon dioxide, to form a pourable free-flowing composition having an initial water content of at least about 44 to 60 percent by weight; adjusting the amounts of alkali silicate and curing agent so that a molar ratio of silicon dioxide to alkali metal oxides in a cured polysilicate to be formed, is greater than 4:1; introducing the pourable composition into a mould cavity between two transparent carrier elements; subsequently and without a drying step, allowing the composition, while retaining all of the initial water content, to cure to form a solid polysilicate layer without drying, said polysilicate layer being in direct connection with said transparent carrier elements, the molar ratio of silicon dioxide to alkali metal oxides in the cured and not dried polysilicate layer, being a ratio greater than 4:1 and the initial water content remaining in the layer.

15. Method as stated in claim 14, including freeing the pourable composition of gas before introducing the pourable composition into the mould cavity.

16. Method as stated in claim 14, wherein the carrier elements have surfaces, the method including adding an anionic or non-ionogenic surfactant to at least one of the pourable composition and the surfaces of the carrier elements for increasing an adhesion between the polysilicate layer and the carrier elements.

17. Method as stated in claim 14, wherein the carrier elements have surfaces, the method including pre-treating the surfaces of the carrier elements with an adhesion enhancing agent in the form of an organo-functional silene.

18. Method according to claim 14 including providing silicic acid or a compound which frees silicic acid as the curing agent.

* * * * *